(12) United States Patent
Bergendahl et al.

(10) Patent No.: US 7,164,470 B2
(45) Date of Patent: Jan. 16, 2007

(54) DEPTH OF FIELD ENHANCEMENT FOR OPTICAL COMPARATOR

(75) Inventors: Marc Bergendahl, Jericho, VT (US); David Lewison, Larchmont, NY (US); Raymond H. Puffer, Jr., Watervliet, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 406 days.

(21) Appl. No.: 10/685,326

(22) Filed: Oct. 14, 2003

(65) Prior Publication Data

US 2005/0078302 A1    Apr. 14, 2005

(51) Int. Cl.
*G01B 9/00* (2006.01)
(52) U.S. Cl. ..................................... 356/124
(58) Field of Classification Search ............... None
See application file for complete search history.

(56) References Cited

U.S. PATENT DOCUMENTS

| | | |
|---|---|---|
| 5,801,822 A | 9/1998 | Lafferty et al. |
| 6,047,082 A | 4/2000 | Rhody et al. |
| 6,765,661 B1 * | 7/2004 | Biel et al. ................. 356/124 |
| 2002/0163638 A1 | 11/2002 | Biel et al. |
| 2004/0061864 A1 * | 4/2004 | Snyder et al. .............. 356/477 |

FOREIGN PATENT DOCUMENTS

EP    0686459 A2    12/1995

* cited by examiner

*Primary Examiner*—Tu T. Nguyen
(74) *Attorney, Agent, or Firm*—John E. Thomas

(57) ABSTRACT

An optical device inspection system and method employing a narrow aperture on a magnifying objective lens in order to reduce the circle of confusion and increase the depth of field. The smaller aperture resulting in an increase in depth of field allows for simultaneous focus for all portions of objects being inspected. An arc lamp with an elliptical reflector in combination with a condenser lens focuses a more intense beam of light through the objective lens, thereby providing sufficient brightness without sacrificing any depth of field.

18 Claims, 2 Drawing Sheets

DEPTH OF FIELD ENHANCEMENT FOR OPTICAL COMPARATOR

BACKGROUND OF THE INVENTION

1. Field of the Invention

The present invention pertains to inspection devices, and more particularly, to inspection devices that are used for contact lenses.

2. Description of the Prior Art

Currently available inspection devices employ image-capturing technology. There are many types of image-capturing devices within the prior art. The size of the apertures used on these prior art devices can range from small apertures to large apertures. It is well known within the imaging arts that a greater depth of field results from using a smaller aperture. Examples of imaging devices that use small apertures are single-use cameras and WebCams. Small apertures are very useful in providing simultaneous focus of objects from three feet to infinity. A shortcoming in the application of small apertures is that only a small amount of light can pass through the small aperture. Imaging devices having small apertures typically require brighter light as compared to similar imaging devices having larger apertures. Those imaging devices that have large apertures inherently allow greater amounts of light to pass through the larger apertures but suffer in that they have a smaller depth of field than the devices that employ smaller apertures.

Inspection systems for optical devices that currently exist typically use large apertures in their optics to create essentially two-dimensional inspection systems. In these two-dimensional systems, a wide-open lens allows substantial amounts of light to pass through, resulting in a bright, consistently-illuminated image that is displayed on a screen. A shortcoming within the prior art devices employing a large aperture lens is that they have a very shallow depth of field.

Currently available inspection devices for contact lenses are essentially two-dimensional systems. Typically, the light source is no more than a halogen light bulb that is used without any reflector at all. These prior art inspection devices do not employ a reflector because sufficient light is available in these systems. Large apertures on an objective lens allow much light to pass, resulting in a bright image but little depth of field. A glass stage is commonly used to retain the object being inspected. The light beam shines through the glass of the stage and backlights the object being inspected. The shadow created by the object is focused through the objective lens and projected very accurately on a screen in front of an inspector who may observe, inspect or take measurements of the edges of the shadow of the object. These two-dimensional inspection devices can also be used to inspect transparent materials for defects. Since the two-dimensional inspection devices are designed to measure the shadow of the object accurately, they have a very narrow depth of field. The result is that only surfaces that are in a flat plane parallel to the objective lens will be in focus. Surfaces at differing heights will not be in focus at the same time. Adjustments can be made to the position of the glass stage retaining the object that is being inspected allowing different portions of the object to be in focus and enabling different features of the object to be inspected.

SUMMARY OF THE INVENTION

The present invention addresses the shortcomings in the prior art that have a larger circle of confusion as a result of employing a large aperture. Instead, the invention uses a narrow aperture on a magnifying objective lens in order to reduce the circle of confusion and increase the depth of field compared to prior art devices. Using a smaller aperture results in a smaller circle of confusion resulting in an increase in depth of field allowing simultaneous focus of entire objects. The trade-off made using a narrow aperture is that there is less light that can pass through a narrow aperture compared to a large aperture resulting in less brightness within the system using the narrow aperture. The advantage is that the depth of field is increased. Prior art inspection devices employ large apertures resulting in more brightness but less depth of field. The lack of depth of field in conventional two-dimensional inspection devices makes it difficult to measure three-dimensional objects that need more than one surface in focus the same time. This invention addresses the problem by increasing the depth of field by a significant amount.

The invention provides a narrow aperture behind the objective lens. This narrow aperture reduces the optical circle of confusion, thereby increasing the focal range, leading to a greater depth of field. The size of the aperture can be varied to change the depth of field to a desired amount. The use of a narrow aperture requires a brighter light source. Since the narrow aperture placed on the objective lens blocks out the majority of light passing through the lens, the resulting image on the screen can be a very dark image. The use of the arc lamp (or another lamp with sufficient light intensity that does not alter the intent of this invention) and a condenser lens focuses a more intense beam of light through the objective lens, thereby creating a brighter image without sacrificing any depth of field. The use of a smooth elliptical reflector on the arc lamp helps to focus the most light possible through the condenser lens, and consequently through the objective lens.

These and other objects of the invention are provided by an inspection system for optical devices having a high intensity lamp configured with a curved reflector, a condenser lens situated to receive light from the high intensity lamp and the curved reflector and produce a collimated beam of light, an object retaining device configured to allow the collimated beam to be incident upon objects to be inspected, an objective lens operatively situated to receive light that passes through objects in the object retaining device, a narrow aperture within an opaque surface that is placed to receive light that passes through the objective lens and a display device operatively connected to display light emerging through the narrow aperture.

DETAILED DESCRIPTION OF THE INVENTION

The purpose of the invention is to acquire an image of the entire contact lens at once. This enables detection of scratches on virtually any portion of the lens. Scratches on the edges or scratches in the middle can be detected in a single step. The invention allows for inspection of the entire contact lens at one time, simultaneously looking for scratches and other defects that exist on either surface or any edge. The preferred embodiment of the invention projects an image magnified ten times on a display screen.

The lack of a depth of field in a prior art two-dimensional inspection device makes it difficult to measure three-dimensional objects that require more than one surface to be inspected. It is, therefore, highly desirable to have the entire object in focus the same time. This invention addresses the problem by increasing the depth of field by a significant amount.

Figure 2:
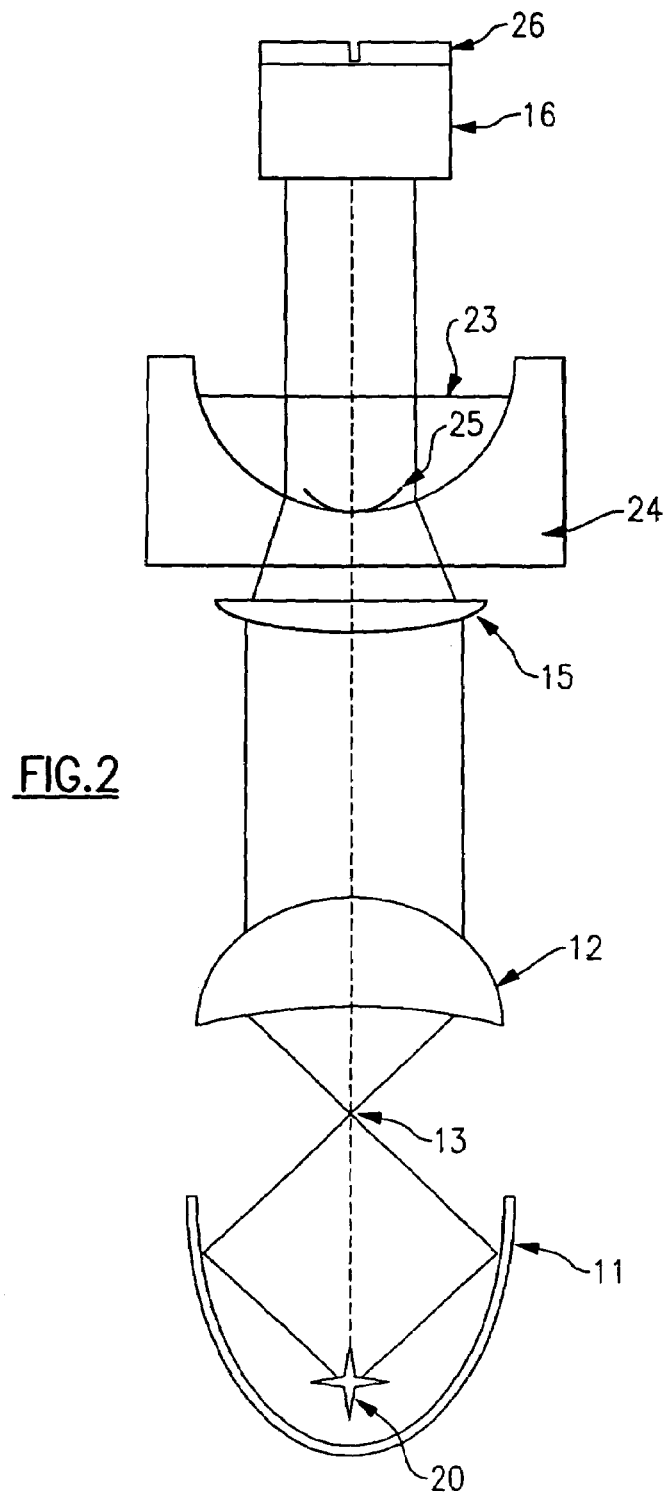
FIG. 2 is a diagram for an inspection device of the invention.

Referring to FIG. 2, the present invention simultaneously focuses on the entire contact lens by initially employing a narrow aperture 26 on the objective lens 16. This narrow aperture 26 reduces the optical circle of confusion, thereby increasing the focal range, leading to a greater depth of field. The size of the narrow aperture 26 can be varied to change the depth of field to a desired amount. In order to use a narrow aperture 26 within the present invention, the light source needs to be modified since the narrow aperture 26 placed on the objective lens 16 blocks out the majority of light through the objective lens 16 and the resulting image could be very dark. The use of the high intensity arc lamp 20 (substitution of which by another lamp with nearly a point source and sufficient light intensity does not alter the intent of this invention) and a condenser lens 12 focuses a more intense beam of light through the objective lens 16, thereby creating a brighter image without sacrificing any depth of field. The present invention employs a smooth elliptical reflector 11 with the arc lamp to assist in focusing the most light possible through the condenser lens 12, and consequently through the objective lens 16.

Prior art inspection devices for testing and inspecting contact lenses are two-dimensional inspection devices and are also known as comparators, converters or profile projectors. These prior art devices project a two-dimensional profile within inspection systems by physically flattening out the contact lens and inspecting it as if it were a two-dimensional object.

Figure 1:
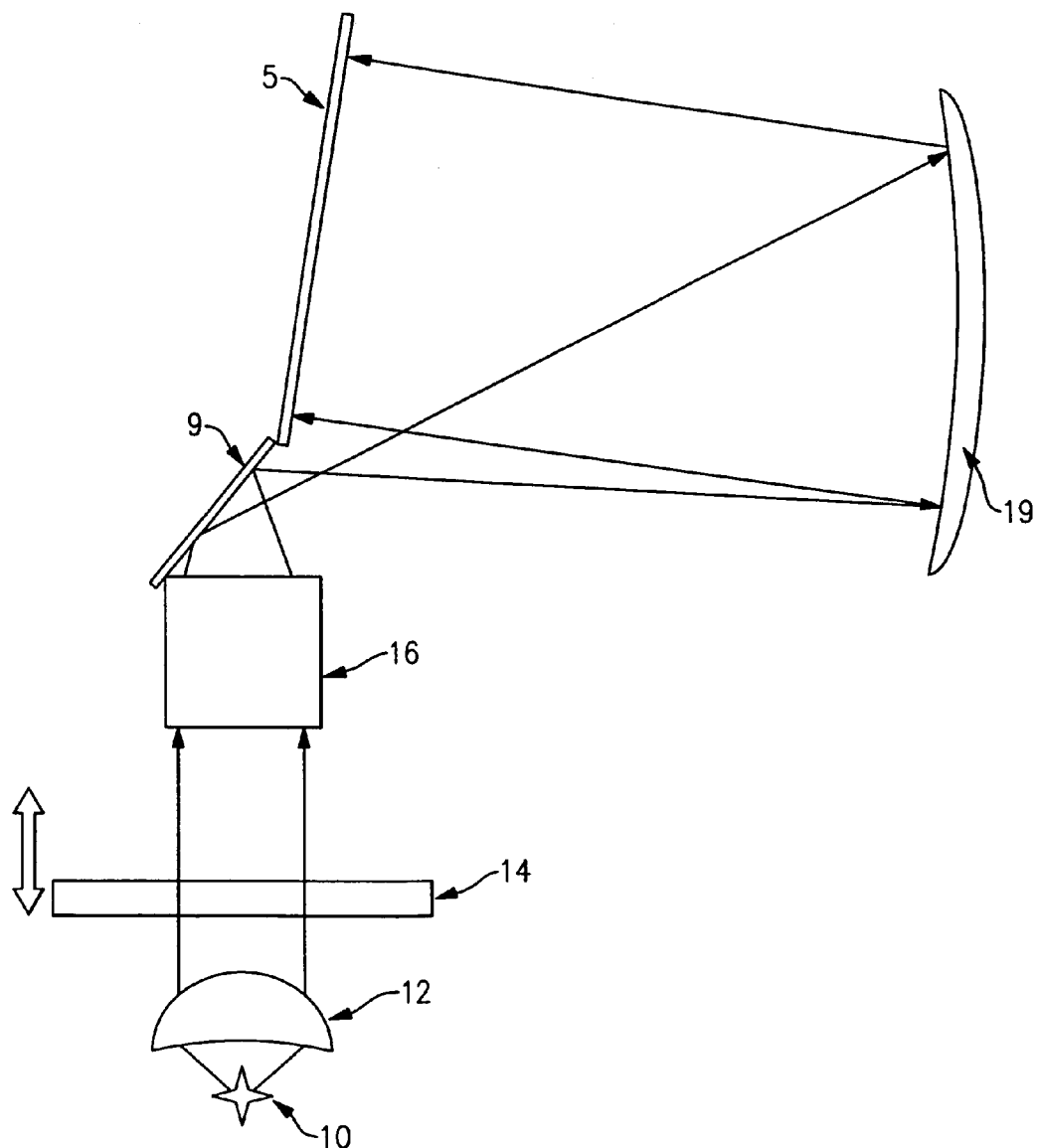
FIG. 1 is a diagram for a prior art inspection device.

FIG. 1 is a diagram for such a prior art two-dimensional inspection device. The light source 10 is typically a halogen 80-watt light bulb that emits light that spreads in a radial manner. A portion of the light from light source 10 is formed into a collimated beam by aspheric condenser lens 12. The optical inspection device, as shown in FIG. 1, uses the 80-watt halogen light bulb for light source 10 to create a light that passes through aspheric condenser lens 12 resulting in the beam of light becoming a collimated beam of light that is incident upon adjustable stage 14 containing the object that is being inspected. After the collimated beam passes through the object that is being inspected, the light passes through an objective lens 16 that typically provides a magnification on the order of ten allowing the image to be presented and easily viewed on a display screen. The adjustable stage 14 allows the object being inspected to be moved either closer to the aspheric condenser lens 12 or the objective lens 16. The light that emerges from the objective lens 16 is reflected from a mirror 9 onto a concave mirror 19 that reflects the light to a coated projection screen 5 for display.

Referring to FIG. 2, the present invention provides three-dimensional imaging of contact lenses to detect scratches and other imperfections. As envisioned, the present invention would typically be used in an assembly line. Light source 20 is preferably a metal halide lamp located inside elliptical reflector 11 that is used to project high intensity light that converges at secondary focal point 13. Secondary focal point 13 is located at a distance from condenser lens 12 that is equal to the focal length of condenser lens 12. A collimated beam of light emerges from condenser lens 12. It is desirable to have very little spread in the beam in order to produce more light on the optical device being inspected and to the objective lens 16. It will be readily understood by those skilled in the art that conventional comparators collimate light and the light is not bright enough for use with the aperture. The reason for this being, as previously stated, that in employing narrow aperture 26, the depth of field is increased at the expense of allowing significantly less light to pass through the narrow aperture 26. Therefore, a light source is used that provides as much light as can be economically provided to the condenser lens 12.

The preferred embodiment employs an elliptical reflector 11 selected having foci that will focus the light from metal halide light source 20 at secondary focal point 13 which is a single focal length away from condenser lens 12.

Secondary focal point 13 located between the actual light source 20 and condenser lens 12 has the effect of moving the light source 20 closer to the condenser lens 12. Placing secondary focal point 13 at the focal point of condenser lens 12 results in light emerging from the condenser lens 12 in an essentially parallel beam. Using this methodology, the light from the point source is effectively collimated and directed towards the contact lens 25 that is to be inspected.

The condenser lens 12 provides a collimated beam of light from the metal halide light source 20 and the secondary focal point 13 (which is placed at a distance equal to the focal length of the condensed lens 12). The condenser lens 12 that is used within the preferred embodiment can be identical to that used in the two-dimensional inspection device shown in FIG. 1 and for that reason has the same reference numeral. To create a collimated beam of light requires a great deal of work on the part of condenser lens 12 and accordingly is quite thick. The condenser lens 12 within the preferred embodiment has a numerical aperture of about 0.9. Ideally, a numerical aperture of 1.0 would be desirable though such numerical aperture is very difficult to achieve, and therefore, is not readily economical. A numerical aperture of 0.9 results in a lens having a focal point that is very close to the lens, requiring that the lens must perform a significant amount of work in order to bend the light in such a short distance. Other condenser lenses having longer focal lengths will be readily apparent to persons skilled in the art. However, the preferred embodiment employs condenser lens 12 having a focal length that is as short as economically feasible. The shorter focal length is preferred because it gathers more of the available light, whereas a longer focal length wastes light. The condenser lens having a short focal length results in a thick lens and is a preferred embodiment of the invention.

Correction condenser lens 15 corrects for the dispersive effects of the glass water cell 24 that holds the contact lens 25 being inspected. Although the water 23 within the glass water cell 24 has a refractive index similar to glass, the refractive index of water is still different from glass. The combination of the water 23 within the water cell 24 and the curvature 26 at the inside bottom of the water cell 24 yields similar results to a dispersive lens and the correction condenser lens 15 accounts for this dispersion effect. The correction condenser lens 15 within the preferred embodiment receives the collimated beam of light from the condenser lens 12 and focuses the collimated beam of light inward as it approaches the glass water cell 24 to counteract the dispersive effect of the glass water cell and the water 23 contained therein. The light that emerges from the glass water cell 24 then is a collimated beam of light 16.

It will be readily apparent to those skilled in the art that embodiments are feasible wherein the condenser lens 12 could be designed to include the correction condenser lens 15. However, the preferred embodiment chooses to separate the condenser lens 12 and the correction condenser lens 15 to provide a collimated beam of light that is focused by the correction condenser lens 15 upon the glass water overcome the dispersive effects of the glass water cell. As previously stated, the condenser lens 12 is required to do much work and is quite thick.

Glass water cell 24 has an interior portion with a curved glass bottom 26 that holds the contact lens 25 being inspected. The curved glass bottom 26, therefore, has refractive properties. The curved glass bottom 26 in the glass water cell 24 performs functions later in the inspection process to allow tipping and removal of the contact lens 25 from glass water cell 24. It will be understood by those skilled in the art that the corrective condenser lens 15 could also be built into the glass water cell 24, therefore the preferred embodiment should not be construed in a manner that would limit the scope of the invention which should be measured by the appended claims.

The comparator objective lens 16 that is used within the preferred embodiment is essentially the same lens as used in the prior art device illustrated in FIG. 1 and provides a magnification of ten within the preferred embodiment. Within the preferred embodiment, the light that emerges from the objective lens 16 is reflected from a right angle mirror 9 onto a concave mirror 19 that reflects the light to a coated projection screen 5 for display as shown in FIG. 1. Narrow aperture 26 is formed on an opaque plate that is placed on objective lens 16 within the preferred embodiment. It will be understood by those skilled in the art that narrow aperture 26 can be implemented in a different manner than illustrated in FIG. 2. The narrow aperture is on the order of 3/16 of an inch which compares to the prior art aperture of 5/8 to 3/4 of an inch for the wide open objective lens 16 shown in FIG. 1.

The present invention increases the depth of field from 1 mm to 4 mm. Having a depth of field on the order of 4 mm allows for complete inspection of the contact lens 25 with all portions of the contact lens being in focus at the same time.

The foregoing description has described the most preferred embodiments known to the inventors. Variations of the foregoing embodiments will be readily apparent to those skilled in the art. Accordingly, the scope of the invention should be measured by the appended claims.

The invention claimed is:

1. An inspection system for an optical device comprising:
a high intensity lamp configured with a curved reflector;
a condenser lens situated to receive light from the high intensity lamp and the curved reflector and produce a collimated beam of light;
an object retaining device configured to allow the collimated beam to be incident upon objects to be inspected;
a correction condenser lens between the condenser lens and the object retaining device, the correction condenser lens being selected to compensate for refraction caused by the object retaining device;
an objective lens operatively situated to receive light that passes through objects in the object retaining device;
a narrow aperture within an opaque surface that is placed to receive light that passes through the objective lens; and
a display device operatively connected to display light emerging through the narrow aperture.

2. The inspection system of claim 1 wherein the high intensity lamp is a metal halide lamp.

3. The inspection system of claim 1 wherein the curved reflector is an elliptical reflector.

4. The inspection system of claim 1 wherein the light from the high intensity lamp and the curved reflector converges at a secondary focal point between the condenser lens and the high intensity lamp.

5. The inspection system of claim 4 wherein the secondary focal point is located at a distance from the condenser lens essentially equal to the condenser lens' focal length.

6. The inspection system of claim 1 wherein the correction condenser lens is formed as pan of the object retaining device.

7. The inspection system of claim 1 wherein the correction condenser lens is formed as part of the condenser lens.

8. The inspection system of claim 1 wherein the condenser lens has a numerical aperture that is essentially 0.9.

9. The inspection system of claim 1 wherein the object retaining device has at least one curved surface that light will pass through during inspection.

10. A method for inspecting optical devices comprising the steps of:
providing a high intensity lamp configured with a curved reflector that is situated with respect to a condenser lens such that light emerging from the high intensity lamp and the curved reflector is incident upon the condenser lens producing a collimated beam of light;
directing the collimated beam of light at an object retaining device containing optical devices to be inspected, wherein a correction condenser lens is provided between the condenser lens and the object retaining device, the correction condenser lens being selected to compensate for refraction caused byte object retaining device;
placing an objective lens to receive light tat passes through objects in the object retaining device;
forming a narrow aperture to receive light that passes through the objective lens; and
displaying light emerging through the narrow aperture.

11. The method for inspecting devices as in claim 10 wherein the step of providing further comprises the high intensity lamp being a metal halide lamp.

12. The method for inspecting devices as in claim 10 wherein the step of providing further comprises the curved reflector being an elliptical reflector.

13. The method for inspecting devices as in claim 10 wherein the step of providing further comprises the light from the high intensity lamp and the curved reflector converging at a secondary focal point between the condenser lens and the high intensity lamp.

14. The method for inspecting devices as in claim 13 wherein the step of providing further comprises locating the secondary focal point is located at a distance from the condenser lens essentially equal to the condenser lens' focal length.

15. The method for inspecting devices as in claim 10 wherein the step of providing further comprises the correction condenser lens being formed as part of the abject retaining device.

16. The method for inspecting devices as in claim 10 wherein the step of providing further comprises providing the correction condenser lens being formed as part of the condenser lens.

17. The method for inspecting devices as in claim 10 wherein the step of providing further comprises providing the condenser lens with a numerical aperture that is essentially 0.9.

18. The method for inspecting devices as in claim 10 wherein the step of placing further comprises placing the object retaining device with at least one curved surface within the object retaining device.

* * * * *

UNITED STATES PATENT AND TRADEMARK OFFICE
CERTIFICATE OF CORRECTION

PATENT NO. : 7,164,470 B2  Page 1 of 1
APPLICATION NO. : 10/685326
DATED : January 16, 2007
INVENTOR(S) : Marc Bergendahl et al.

It is certified that error appears in the above-identified patent and that said Letters Patent is hereby corrected as shown below:

Col. 6, line 2
  replace "pan"
  with --part--.

Col. 6, line 25
  replace "tat"
  with --that--.

Col. 6, line 49
  replace "abject"
  with --object--.

Signed and Sealed this

Eighth Day of May, 2007

JON W. DUDAS
*Director of the United States Patent and Trademark Office*